(12) United States Patent
Pestov

(10) Patent No.: US 11,861,864 B2
(45) Date of Patent: Jan. 2, 2024

(54) SYSTEM AND METHOD FOR DETERMINING MEDIATED REALITY POSITIONING OFFSET FOR A VIRTUAL CAMERA POSE TO DISPLAY GEOSPATIAL OBJECT DATA

(71) Applicant: vGIS Inc., Toronto (CA)

(72) Inventor: Alexandre Pestov, Toronto (CA)

( * ) Notice: Subject to any disclaimer, the term of this patent is extended or adjusted under 35 U.S.C. 154(b) by 357 days.

(21) Appl. No.: 17/443,271

(22) Filed: Jul. 23, 2021

(65) Prior Publication Data

US 2023/0023906 A1   Jan. 26, 2023

(51) Int. Cl.
*G06T 7/73* (2017.01)
*H04N 5/222* (2006.01)
*G06T 7/20* (2017.01)

(52) U.S. Cl.
CPC .............. *G06T 7/73* (2017.01); *G06T 7/20* (2013.01); *H04N 5/2224* (2013.01); *G06T 2207/30244* (2013.01)

(58) Field of Classification Search
CPC .. G06T 7/20; G06T 7/254; G06T 7/70; G06T 7/73; G06T 15/20; G06T 15/205; G06T 19/20; G06T 2215/16
See application file for complete search history.

(56) References Cited

U.S. PATENT DOCUMENTS

| | | |
|---|---|---|
| 10,152,665 B2 | 12/2018 | Ardö et al. |
| 10,311,643 B2 | 6/2019 | Daniels et al. |
| 10,373,035 B2 | 8/2019 | Skans et al. |
| 10,559,136 B2 | 2/2020 | Daniels et al. |
| 10,964,116 B2 | 3/2021 | Daniels et al. |
| 11,354,870 B2 | 6/2022 | Daniels et al. |
| 2016/0343137 A1 | 11/2016 | Skans et al. |
| 2017/0323187 A1 | 11/2017 | Ardö et al. |
| 2018/0005450 A1 | 1/2018 | Daniels et al. |
| 2019/0304199 A1 | 10/2019 | Daniels et al. |
| 2020/0273256 A1 | 8/2020 | Daniels et al. |
| 2021/0019913 A1* | 1/2021 | Huang et al. ............. G06T 7/80 |
| 2021/0264675 A1 | 8/2021 | Daniels et al. |

* cited by examiner

*Primary Examiner* — Andrew W Johns
(74) *Attorney, Agent, or Firm* — Bhole IP Law; Anil Bhole; Marc Lampert

(57) ABSTRACT

In various aspects, there is provided a system and method for determining a mediated reality positioning offset for a virtual camera pose to display geospatial object data. The method comprising: determining or receiving positioning parameters associated with a neutral position; subsequent to determining or receiving the positioning parameters associated with the neutral position, receiving positioning data representing a subsequent physical position; determining updated positioning parameters associated with the subsequent physical position; determining a updated offset comprising determining a geometric difference between the positioning parameters associated with a neutral position and the updated positioning parameters associated with the subsequent physical position; and outputting the updated offset.

20 Claims, 14 Drawing Sheets

SYSTEM AND METHOD FOR DETERMINING MEDIATED REALITY POSITIONING OFFSET FOR A VIRTUAL CAMERA POSE TO DISPLAY GEOSPATIAL OBJECT DATA

TECHNICAL FIELD

The following relates generally to geospatial data collection; and more particularly, to systems and methods for determining mediated reality positioning offset for a virtual camera pose to display geospatial object data.

BACKGROUND

Surveying firms, mapping firms, municipalities, public utilities, and many other entities, collect, store, use, and disseminate vast amounts of geospatial data. This geospatial data can be used to manage daily operations and conduct mission-critical tasks; for example, asset maintenance, construction plan design, zoning proposals, among many others. Traditionally, geospatial data is collected using manual measurements (offsets) from detectable local landscape features; for example, a curb line. Then the collected measurements would be plotted on a map to indicate object/asset locations. The maps could then be reprinted for use in the field. While much of this geospatial data can be digitized, the accuracy and quality of such digital representations may affect the tasks and applications that rely on such data. In other approaches, location tools, such as global navigation satellite systems (GNSS) and/or real-time kinematic (RTK), can be used to collect digital geospatial data. These approaches generally require cumbersome, unsophisticated, and time-consuming validation techniques.

Mediated reality (MR) systems, including augmented reality (AR), mixed reality, and virtual reality (VR), provide interactive experiences with a real-world and/or virtual world environment. In such cases, objects that reside in the real world can be augmented or represented by computer-generated perceptual information. As an application of such mediated reality systems, the above geospatial data can be augmented or represented to a user in comparison to real-world object/asset locations. However, often the location of such digital representations may be inaccurate.

SUMMARY

In an aspect, there is provided a computer-executable method for determining a mediated reality positioning offset for a virtual viewpoint to display virtual geospatial objects, the method comprising: determining or receiving positioning parameters associated with a neutral position of a positioning device; subsequent to determining or receiving the positioning parameters associated with the neutral position, receiving positioning data representing a subsequent physical position of the positioning device; determining updated positioning parameters associated with the subsequent physical position of the positioning device; determining an offset comprising determining a geometric difference between the positioning parameters associated with a neutral position and the updated positioning parameters associated with the subsequent physical position; and outputting the offset.

In a particular case of the method, the positioning parameters comprise roll, pitch, and yaw.

In another case of the method, the method further comprising adjusting placement of the virtual geospatial objects using the outputted offset.

In yet another case of the method, adjusting the placement of the virtual geospatial objects comprises: determining an absolute position of the subsequent physical position using the outputted offset and a viewing direction of a physical viewpoint; using the absolute position of the subsequent physical position, determining an updated position of the virtual viewpoint; and instructing rendering of the virtual geospatial objects using the updated position of the virtual viewpoint.

In yet another case of the method, the method further comprising tracking direction of movement of the subsequent physical position to incorporate into the offset.

In yet another case of the method, tracking the direction of movement to incorporate into the offset comprises: detecting a vector representing an orientation of the virtual viewpoint; determining a direction of movement between the neutral position and the subsequent physical position; and determining an offset representing the direction of movement to incorporate into the offset by determining an angle between the vector of the orientation of the virtual viewpoint and the direction of movement.

In another aspect, there is provided a system for determining a mediated reality positioning offset for a virtual viewpoint to display virtual geospatial objects on a mediated reality device, the system in communication with a positioning device, the system comprising one or more processors in communication with a data storage to execute: a positioning module to receive positioning parameters associated with a neutral position from the positioning device, to receive positioning data representing a subsequent physical position from the positioning device subsequent to receiving the positioning parameters associated with the neutral position, and to determine updated positioning parameters associated with the subsequent physical position; an offset module to determine an offset by determining a geometric difference between the positioning parameters associated with a neutral position and the updated positioning parameters associated with the subsequent physical position, and output the offset.

In a particular case of the system, the positioning parameters comprise roll, pitch, and yaw.

In another case of the system, the positioning parameters are received from an inertial measurement unit.

In yet another case of the system, the system further comprising a correction module to adjust placement of the virtual geospatial objects for the mediated reality device using the outputted offset.

In yet another case of the system, adjusting the placement of the virtual geospatial objects comprises: determining an absolute position of the subsequent physical position using the outputted offset and a viewing direction of a physical viewpoint; using the absolute position of the subsequent physical position, determining an updated position of the virtual viewpoint; and instructing rendering of the virtual geospatial objects using the updated position of the virtual viewpoint.

In yet another case of the system, the positioning module further tracks direction of movement of the subsequent physical position to incorporate into the outputted offset by the offset module.

In yet another case of the system, tracking the direction of movement to incorporate into the outputted offset comprises: detecting, by the positioning module, a vector representing an orientation of the physical viewpoint; determining, by the positioning module, a direction of movement between the neutral position and the subsequent physical position; and determining, by the offset module, an offset representing the direction of movement to incorporate into the outputted offset by determining an angle between the vector of the orientation of the virtual viewpoint and the direction of movement.

In yet another case of the system, the positioning device comprises a global navigation satellite system (GNSS) receiver or real-time kinematic positioning (RTK) receiver, or a combination of both.

In yet another case of the system, the positioning device comprises a total station receiver.

In yet another case of the system, an antenna of the positioning device is physically separate in space from the physical viewpoint of the mediated reality device.

In yet another case of the system, the positioning device comprises an antenna mounted on the end of an elongated object.

In yet another case of the system, receiving positioning parameters associated with the neutral position comprises retrieving the positioning parameters associated with the neutral position stored in the data storage or retrieving an indication for a user that the positioning device is in a neutral position.

In yet another case of the system, receiving positioning parameters associated with the neutral position comprises receiving an initial offset.

In yet another case of the system, the subsequent physical position comprises a tilt of the antenna relative to the base of the elongated object.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Figure 1:
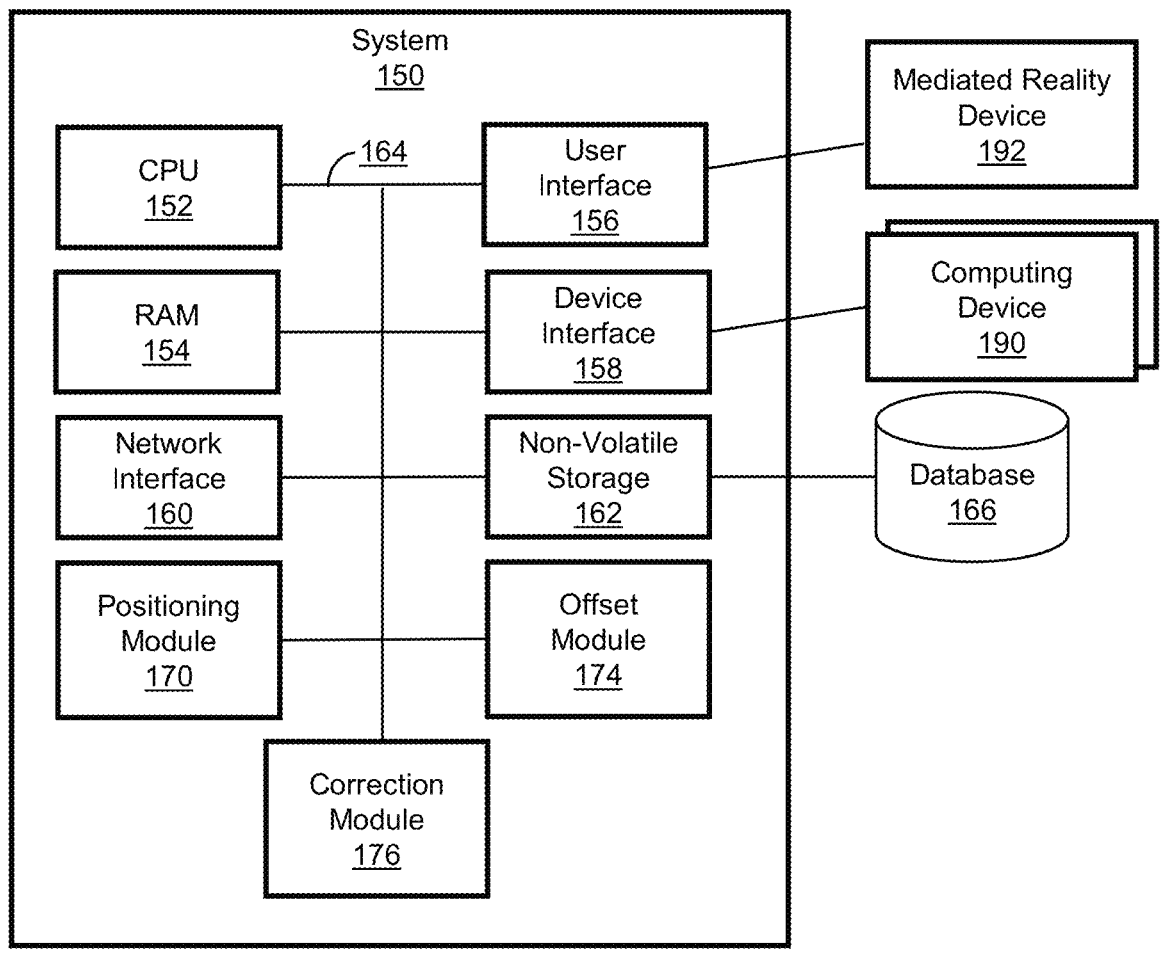
FIG. 1 illustrates a block diagram of a system for determining mediated reality positioning offset for a virtual camera pose to display geospatial object data, according to an embodiment.

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

The following relates generally to geospatial data collection; and more particularly, to systems and methods for determining mediated reality positioning offset for a virtual camera pose to display geospatial object data.

Figure 4:
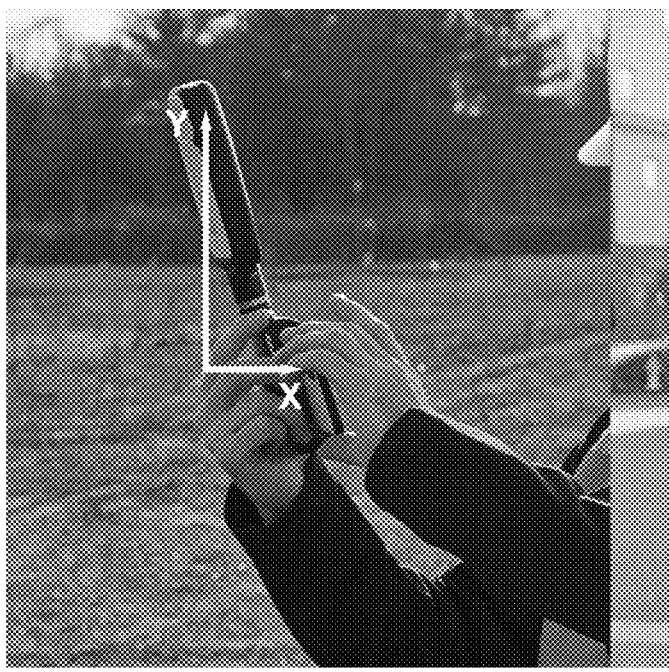
FIG. 4 illustrates a positioning device (antenna) horizontally and vertically tilted from a visualization device.
Figure 5:
FIG. 5 illustrates the positioning device (antenna) not-tilted from the visualization device.
Figure 6:
FIG. 6 illustrates a tilt-induced offset differential between a pole-mounted positioning device and a virtual viewpoint visualization device.
Figure 7:
FIG. 7 illustrates an offset between a backpack-mounted positioning device and a virtual viewpoint visualization device.

In many cases, Augmented Reality (AR) can be used in the geospatial data collection and verification. High-accuracy AR geospatial data collection generally relies on a combination of a global navigation satellite systems (GNSS) and/or real-time kinematic (RTK) positioning, surveying prism, or other types of positioning tracking approaches, in combination with AR software, to display spatial data in relations to a positioning device. AR visuals are generally displayed in relation to the visualization device's camera. To improve accuracy of visuals, the AR software can use of a defined offset to take into account where the positioning device is located relative to the visualization device's camera. However, as illustrated in the examples of FIGS. 4 and 5, typical operations require frequent device titling, and thus, the offset frequently changes. The offset due to tilting becomes especially pronounced when a surveying pole, a backpack-based antenna, or a head-mounted antenna are used; as illustrated in the example of FIGS. 6 and 7. Such tilt introduces unavoidable inaccuracies during operations, as the device's camera is not set correctly relative to the positioning device. For example, in such situations, the antenna's position is usually defined as being several tens of centimeters behind the user. However, if the user begins to move sideways, the antenna begins to move in parallel to the device, and not trailing it. Thus, the offset between the camera and the antenna changes from being several tens of centimeters behind the user to several tens of centimeters beside the user. It is very important for high-precision applications, such as in preparation for engineering work, that the accuracy of the AR visuals remain within centimeters of the true location. As the tilt may introduce positioning shift of up to more than a meter (especially for pole-mounted GNSS devices), compensating for the shift is substantially important for maintaining positioning accuracy.

While the following disclosure refers to mediated reality, it is contemplated that this includes any suitable mixture of virtual aspects and real aspects; for example, augmented reality (AR), mixed reality, modulated reality, holograms, and the like. The mediated reality techniques described herein can utilize any suitable hardware; for example, smartphones, tablets, mixed reality devices (for example, Microsoft™ HoloLens™), true holographic systems, purpose-built hardware, and the like.

In some cases, geospatial data can be stored on a database after having been collected using any suitable approach; as an example, using geographic information systems (GIS) using, for example, a total station receiver, a high-precision global navigation satellite systems (GNSS) receiver and/or a real-time kinematic (RTK) positioning receiver.

Advantageously, the present embodiments employ advanced visualization technologies, such as mediated reality techniques, to work in conjunction with other data collection techniques, such as visual positioning systems, to collect, adjust and/or verify the positioning of representations of geospatial data.

Turning to FIG. 1, a system for determining mediated reality (MR) positioning offset for a virtual camera pose to display geospatial object data 150 is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, a mixed reality device (for example, a Microsoft™ HoloLens™), true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen).

The mediated reality device 192 can display a mediated reality 'live' view (such as a video stream or a sequential stream of captured images) received from a camera. This live view is oriented in a particular determined direction. In embodiments using holographic devices, in some cases, receiving the 'live view' can be omitted because the visual representation itself is displayed in the physical space.

Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of functional modules to be executed on the one or more processors 152, including an positioning module 170, a positioning module 170, a offset module 174, and a correction module 176. In further cases, the functions of the modules can be combined or executed by other modules.

Figure 9:
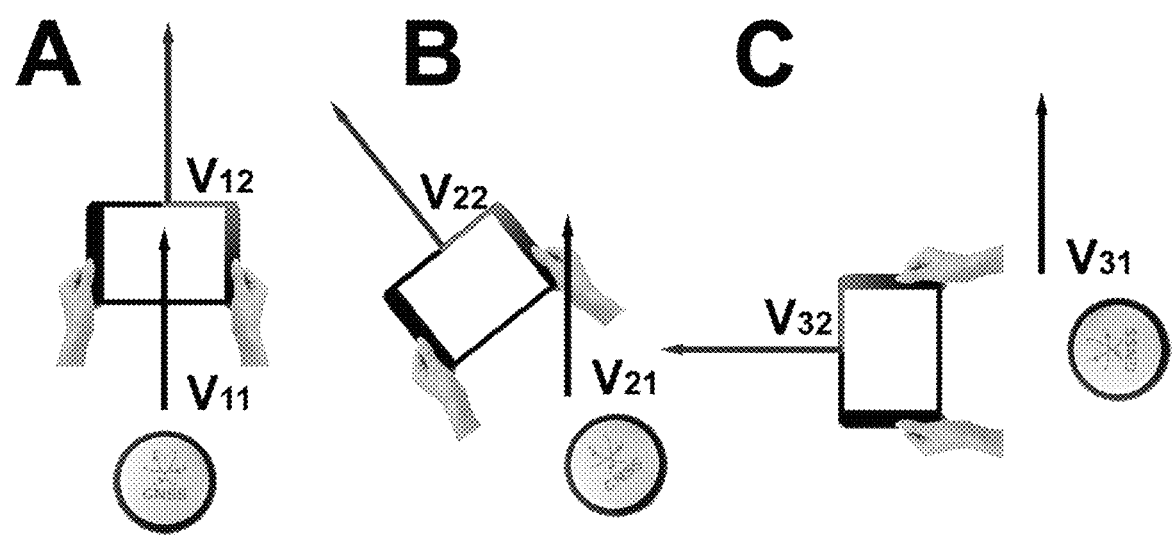
FIG. 9 illustrates a timeline of a changing angle between a direction of movement of a MR rig and a heading of the MR device.

FIG. 9 illustrates a diagrammatic example showing depending on how the MR device and positioning device moves (i.e., straight ahead, on an angle, or completely sideways), the relative positioning of the MR device relative to the positioning device moves, and the positioning device shifts from being behind to beside. Thus, if the position of the virtual display of the MR device is determined relative to the positioning device based on fixed offsets, it will be incorrect.

In the present embodiments, the positioning module 170 of the system 150 determines the position, velocity, and precise time by processing the signals received from multiple satellites via a GNSS receiver computing device 190. The position and velocity can be determined periodically or at any suitable times. GNSS can use satellites from one or more positioning systems, including global position system (GPS), global navigation satellite system (GLONASS), Galileo, Beidou, quasi-zenith satellite system (QZSS), and other regional systems. Based distance estimates determined from the multiple GNSS satellites, the GNSS receiver can determine position data; for example, including one or more of latitude, longitude, and elevation relative to the Earth or relative to a structure or object on the Earth.

While the present embodiments describe using GNSS, it is appreciated that any spatial positioning frameworks of commercially suitable accuracy can be used; for example, total station, GPS, GLONASS, Galileo, Beidou, QZSS, Wi-Fi positioning system (WPS), cellular network positioning, and/or other approaches.

Figure 8:
FIG. 8 illustrates a rig of a mediated reality (MR) visualization device and a high-accuracy positioning device mounted directly on top of the MR device.

FIG. 8 illustrates an example of a high accuracy MR visualization device with a positioning device mounted above the visualization device. The example of FIG. 8 illustrates a user using the mediated reality device 192 (a tablet computer) to view an object in the geospatial data (a bus station) superimposed on an image captured by the camera or a virtual representation. The camera can be part of the mediated reality device 192, a stand-alone computing device, or part of another computing device. In some cases, there can be multiple cameras. In some cases, the mediated reality device 192, the positioning module 170, or a combination, can determine position using computer vision recognition of objects in the environment. In some cases, the mediated reality device 192 can include one or more other sensors to determine position and/or orientation; for example, accelerometers, inertial sensors, and/or gyroscopes. Position includes a coordinate (for example, three-dimensional) representing the relative position of the mediated reality device 192 and orientation (for example, a three-dimensional vector) includes representations of the relative heading or direction of the mediated reality device 192. The positioning module 170 can determine position and orientation periodically, or at any suitable time.

For accurate placement of the geospatial object relative to the environment by the mediated reality device 192, positioning and orientation of the system 150 need to be determined. The MR positioning data determined by the positioning module 170 and the geographic positioning data determined by the positioning module 170 can be used conjunctively by the offset module 174 to determine an accurate position of the system 150. Generally, due to inherent inaccuracies, the MR positioning data determined or received by the positioning module 170 and the geographic positioning data determined or received by the offset module 174 are going to differ. MR positioning data is generally less accurate due to requiring initialization; such as having to establish a temporary local reference frame with a first predetermined point. Additionally, MR positioning data generally has unsatisfactory accuracy and is prone to drift over time and distance. Further, coordinate positioning data (such as from GNSS) can also have inherent error and imprecision. Thus, the MR positioning data and the geographic positioning data require periodic reconciliation to ensure high accuracy and proper placement of the geospatial objects relative to the environment.

Generally, it is difficult to maintain accurate headings when using geographic positioning, such as with the GNSS receiver. In some cases, the MR positioning data and the geographic positioning data can be reconciled using a vector approach, multiantenna setup, compass, MR/physical path convergence, or other approaches. Once accurate positioning and heading are established, any shift of the positioning device relative to an MR virtual viewpoint will introduce inaccuracies to the MR visual placement. Geospatial objects are displayed in MR relative to the assumed position of the virtual viewpoint. The virtual viewpoint position is calculated based on the positioning device output. Shift of the positioning device will update the position of the virtual viewpoint. Although the virtual viewpoint did not move itself, the MR device will consider that it did, causing to reproject the visuals.

Figure 10:
FIG. 10 illustrates a high accuracy MR rig comprising of a visualization device and a high-accuracy positioning device mounted on top of a pole.

FIGS. 4 and 5 demonstrate that a slightest tilt to the MR device can cause the positioning device to move relative to the virtual viewpoint. Such moves are unavoidable under normal operating conditions due to how the operator uses the device. This issue is magnified with antennas that are located at the end of an elongated object, such as the pole-mounted system exemplified in FIG. 10, causing much greater shift. As illustrated in FIG. 6, tilting the MR device/rig moves the position of the antenna relative to the visualization device lower and horizontally away relative to the "neutral" upright position illustrated in FIG. 10; thus, shifting the displayed visuals by the same amount vertically and horizontally. The tilt of the MR device/rig can occur in any direction.

Since the MR device can be used to display geospatial objects and data, it is important to determine an accurate location of the camera in space (e.g., latitude, longitude, elevation and heading) to set a pose of the virtual camera displayed by the MR device relative to the virtual (digital) representations of the geospatial objects. The position of the camera of the MR device relative to the positioning device can be determined by obtaining the position of the positioning device (e.g., GNSS) and applying offsets to the virtual camera. It works well if the positioning device stays in the same position relative to the camera of the MR device. However, once tilt is introduced, the position of the positioning device (e.g., GNSS) relative to the camera of the MR device changes. If the offsets are applied using the original offset settings, then the camera of the MR device will be calculated incorrectly. It will lead to defining the wrong virtual pose for the virtual camera, thus placing digital geospatial objects in incorrect positions. In an example, if a pole-based positioning device is used, and the pole is tilted, fixed offsets between the MR device camera and the pole-based positioning device will make it look like the user moved forward by 1 m (if the pole is tilted, and the antenna at the end of the positioning device moved forward by 1 m relative to its neutral position). However, the user did not move, so the virtual objects will shift by 1 m in the virtual camera, causing significant inaccuracies in the MR object representation.

This situation can be further complicated by separating the positioning device (such as an antenna) and the visualization device, by, for example, placing the positioning device in a backpack (as illustrated in the example of FIG. 7). Under strict operating conditions, the MR device can determine the distance between the positioning device and the virtual viewpoint of the MR device. As the user moves forward, the MR device can offset the visuals by the same distance. However, as exemplified in FIG. 9, if the user starts walking sideways, by examining a fence or a wall, the MR device will continue calculating the offset as if the positioning device was behind the virtual viewpoint along the moving path. However, since the user is moving sideways, the positioning device moves besides the virtual viewpoint, and not behind it, introducing significant positioning inaccuracies to the projected visuals.

Advantageously, the present embodiments address the substantial technical challenges present in having to deal with the accurate placement of geospatial data relative to the virtual viewpoint using high-accuracy positioning data of the MR device as a reference.

Figure 15:
FIG. 15 is an example screenshot of a selection of geospatial objects.

In many cases, the system 150, via the user interface 156, directs the mediated reality device 192 to present at least a subset of a library of geospatial objects to the user. The objects can come from an internal library of geospatial object definitions, an external library of geospatial object definitions, or a library of geospatial object definitions defined by the user. In some cases, the user can provide input to create or edit object definitions. An example screenshot of such a presentation is shown in FIG. 15. In some cases, object definitions be generated automatically based on one or many dynamic factors. The object definition can have associated therewith attributes of the object; for example, geometry type, 2D or 3D model parameters, the object type (for example, hydrant or manhole), object condition, colour, shape, and other parameters. In other cases, the object can be defined as a simple point, line, or area, without any additional attributes. In some cases, a machine vision model can be used to identify objects in a scene captured by the mediated reality device 192, and then identify an aspect of the object; for example, a closest point of the object or a center of the object. In some cases, the object library can be integrated with external systems. The format of the objects in the library can include GeoJSON or other protocols. In an example external integration arrangement, the external system crafts a token that contains information necessary for the system 150 to understand what object is being collected and what are the properties of such object. This token can then be passed to the system 150 via the network interface 160 using "pull" or "push" request approaches.

The object definition can include, for example, the type of object; such as, a pipe or a point. In further cases, the object definition can also include attributes or characteristics of the object. As an example, the object definition can include: a manhole 1.2 m wide and 3.2 m deep with grey cover installed in 1987 oriented 14d North. Generally, the definition can be as extensive or as simple as required to generate a visual representation.

In many cases, the system 150, via the user interface 156, presents a visual representation to the user via the user interface 156, where the visual representation encompasses geospatial objects defined above. The visual representation can be, for example, a three-dimensional (3D) digital-twin model resembling the collected object. In further cases, the visual representation can be, for example, a symbol representing the object, such as a point, a flag, a tag, or the like. In further cases, the visual representation can be, for example, a schematic representation, a raster image, or the like. In some cases, the type of visual representation can be associated with the object in the library; and in other cases, the type of visual representation can be selected by the user. In some cases, along with the visual representation, other information can be displayed; for example, distance, elevation, size, shape, colours, and the like, can be displayed to assist with visualization and/or precise placement. In some cases, such as with GIS, the visual representation location can be represented by a single point, line, or outline, and to help the user understand where the object is placed, a point, a cross, a line, or other means, can be used within the visual representation.

Figure 16:
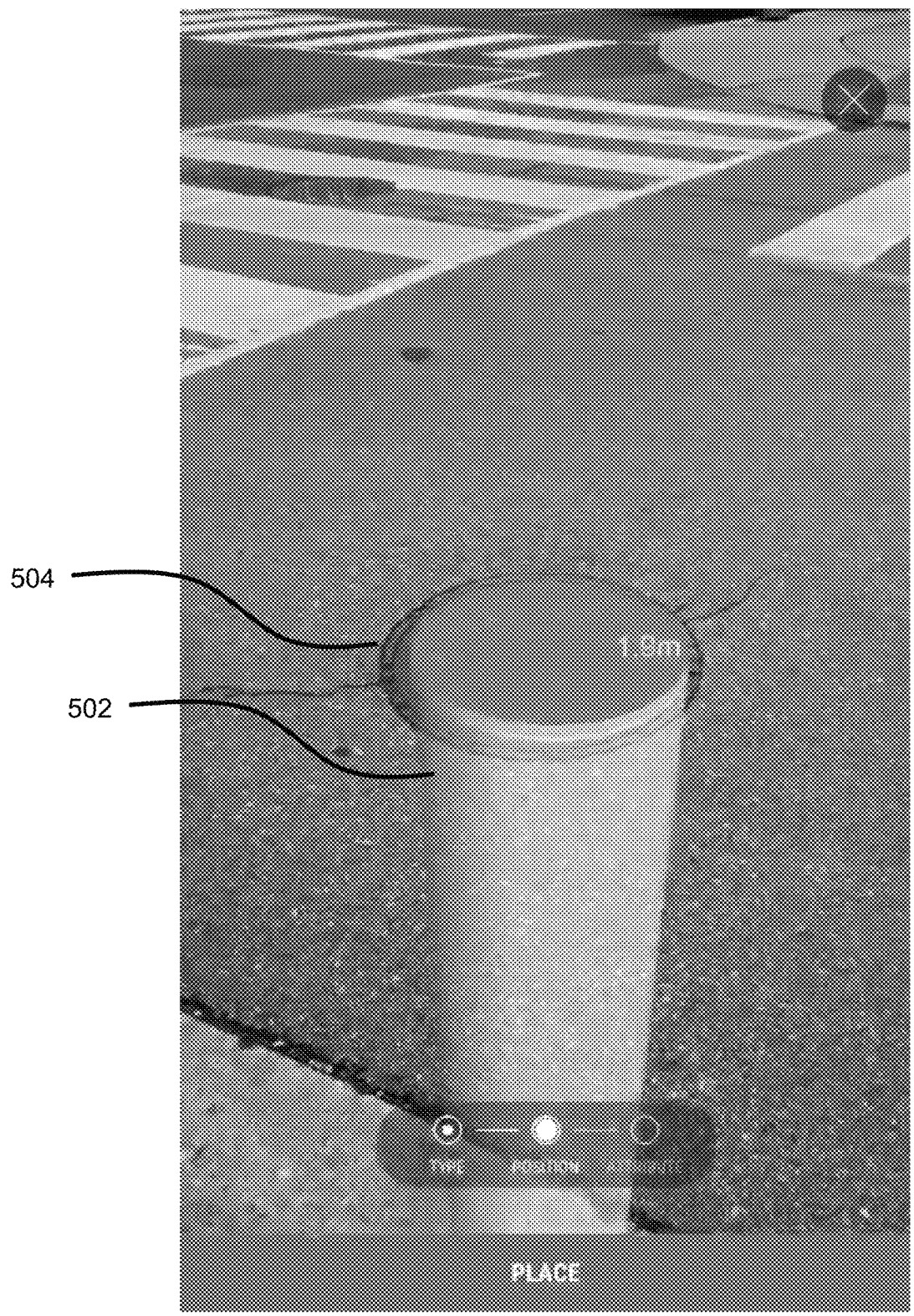
FIG. 16 is an example screenshot of a three-dimensional (3D) model of a geospatial object displayed over real-world objects via a mediated reality device.

FIG. 16 illustrates an example screenshot of a visual representation (3D model) of a sewer pipe 502 presented on the screen collocated with a real-life sever manhole 504. As illustrated, the background of the screen can be the mediated reality 'live' view received from the camera that is oriented in the direction of the system 150.

Figure 2:
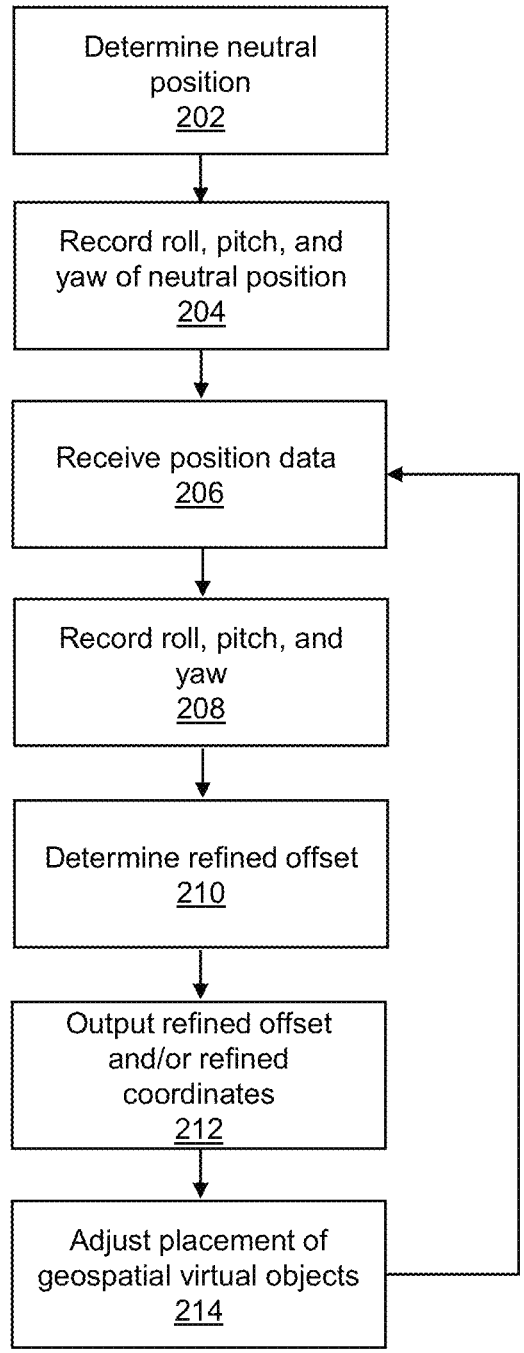
FIG. 2 illustrates a flow diagram of a method for determining mediated reality positioning offset for a virtual camera pose to display geospatial object data, according to an embodiment.

Turning to FIG. 2, a flowchart of a method 200 for determining mediated reality (MR) positioning offset for a virtual camera pose to display geospatial object data is shown, according to an embodiment.

Figure 3:
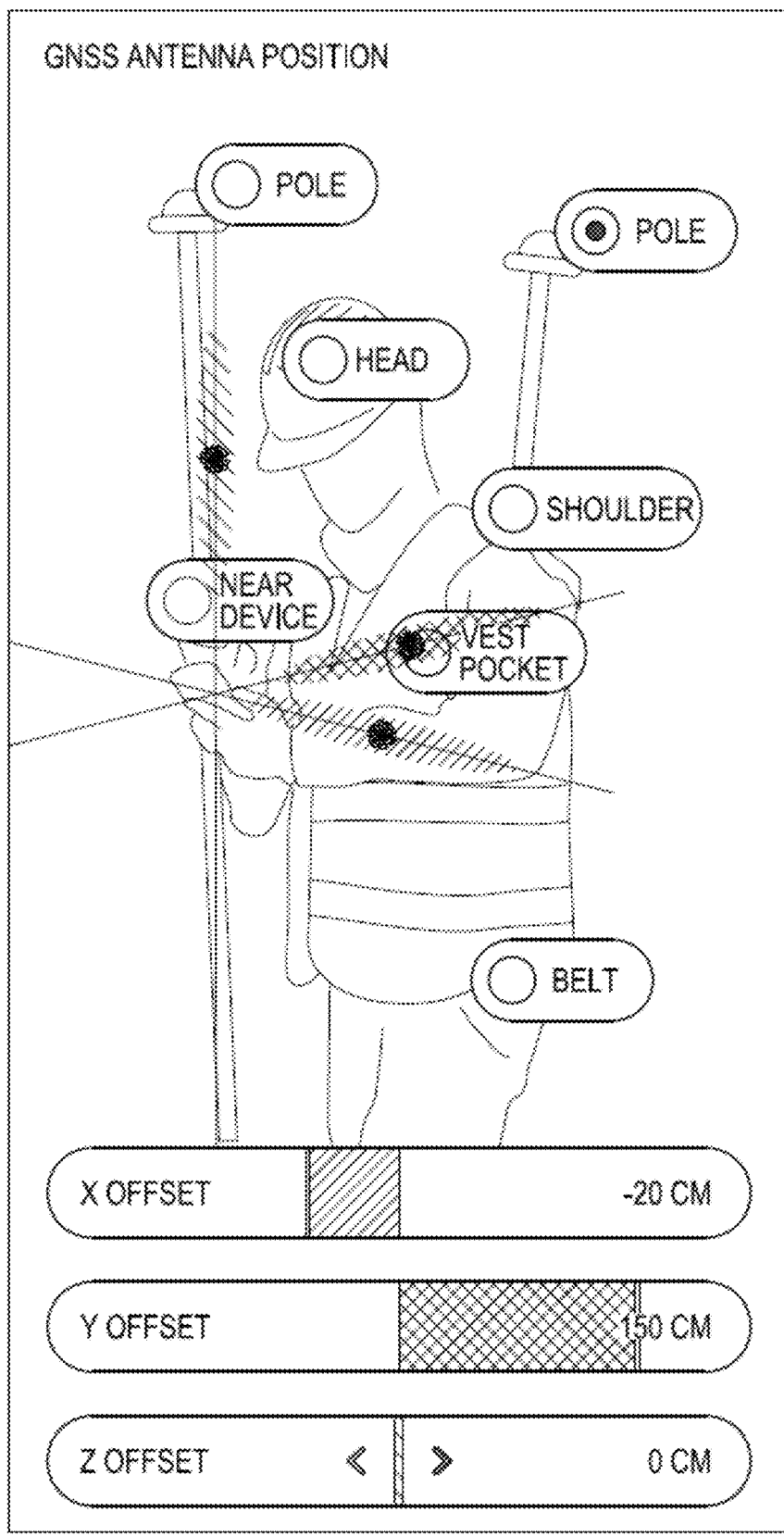
FIG. 3 illustrates an exemplary screenshot of manually setting neutral offsets.
Figure 11:
FIG. 11 illustrates an example of a neutral position of an MR rig.
Figure 12:
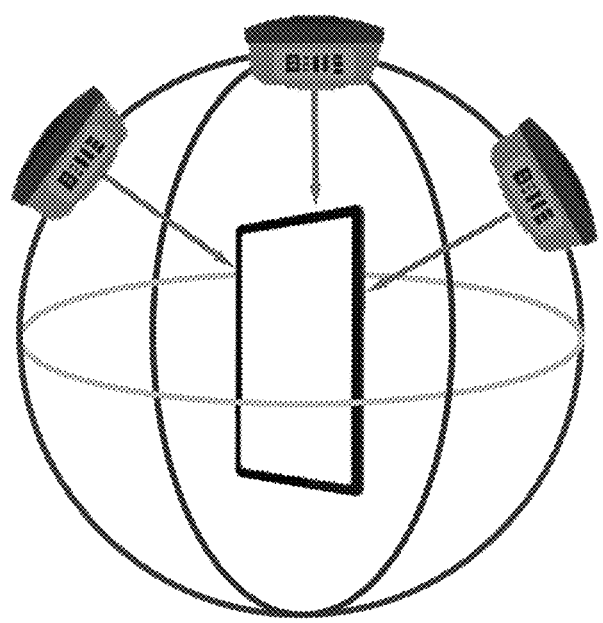
FIG. 12 illustrates tracking of a location of a positioning device relative to a visualization viewpoint using roll, pitch and yaw of the visualization device, with a neural position indicated by a topmost position (middle position) of the positioning device.

At block 202, the positioning module 170 determines, or receives an indication, that the system 150 is in a neutral position. In some cases, the neutral position is defined by the point where the MR visualization device 192 is leveled horizontally and GNSS receiver computing device 190 is at or near the topmost point along the possible rotation point along the x-axis in the y-z plane relative to its fulcrum point. For example, as illustrated in FIG. 11 and the middle position illustrated in FIG. 12. In further cases, the neutral position can be retrieved from previous sessions stored in the database 166, entered manually, or defined through other means. For example, via neutral x1, y1, z1 offset entry as depicted in the example of FIG. 3.

At block 204, the positioning module 170 records, receives, or determines positioning parameters associated with the neural position. For example, the roll, pitch, and yaw associated with the neutral position using suitable internal and/or external sensors, such as an inertial measurement unit (IMU) using gyroscopic sensors.

At block 206, the positioning module 170 receives positioning data representing a physical position from a spatial sensor type computing device 190; where the physical position includes geographical coordinates. In most cases, the geographical coordinates are relative to the surface of the earth, for example latitude and longitude. In other cases, the geographical coordinates can be relative to another object; for example, relative to a building or landmark. In some cases, the physical position includes an elevation. In some cases, the positioning module 170 also receives or determines an orientation or bearing. In an example, the positioning module 170 can determine the position and orientation in 2D or 3D space (latitude, longitude, and, in some cases, elevation) using internal or external spatial sensors and positioning frameworks; for example, GNSS and/or RTK, Wi-Fi positioning system (WPS), manual calibration, vGIS calibration, markers, and/or other approaches. The positioning module 170 can then track the position and/or the orientation during operation. In some cases, machine vision combined with distance finders can be used to determine position, for example, using triangulation. In some cases, distance can be determined, for example, by using a built-in or external range finder spatial sensor directed to the object. In some cases, distance can be determined by a spatial sensor by capturing several images of the scene and comparing pixel shift. In some cases, distance can be determined using time-of-flight (TOF) spatial sensors. In some cases, beacon-based positioning can be used; for example, using iBeacon™.

At block 208, the positioning module 170 records updated positioning parameters (for example, the roll, pitch, and yaw of the MR device) at the time associated with receiving the position from the positioning module 170 in order to determine updated coordinates based on the recorded roll, pitch, and yaw, as described herein.

At block 210, the offset module 174 determines an updated offset for the positioning device. Using initial offsets between the camera of the MR device and the antenna of the positioning device in the neutral position, titling the positioning device will move the antenna relative to the neutral axis. The initial offsets can be received as input from the user, received over a communication network such as the internet, or factory-set based on device type. The updated positioning parameters can thus be used to determine the distance between the camera of the MR device and the positioning device. Using geometric relationships, such as Pythagorean theorem, the difference between the initial (x, y, z) angles of the neutral position and the (x, y, z) angles (roll, pitch, yaw) of the updated positioning parameters, with the distance between the camera of the MR device and the positioning device, provide the updated coordinates of the positioning device in (x, y, z) space relative to the camera of the MR device.

Figure 13:
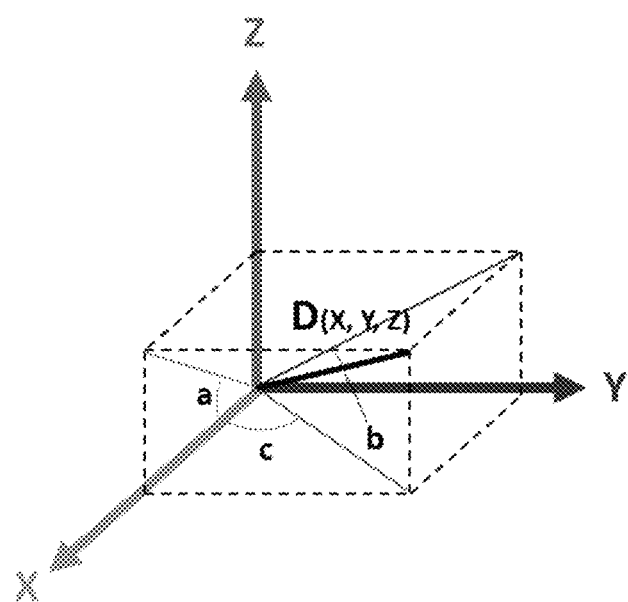
FIG. 13 illustrates a diagram of determining of offsets using roll, pitch and yaw values.

In a particular case, using the neutral position values (neutral x1, y1, z1 offset) and the updated coordinates (x2, y2, z2), the offset module 174 determines a diagonal length for a rectangular prism configuration (as illustrated in FIG. 13) or a hypotenuse in a triangle configuration. The difference between the neutral position values and the end point of the diagonal length or hypotenuse represented by the updated offset values (x2, y2, z2) represents the distance that the positioning device has moved from the neutral position, and thus, the updated offset.

At block 212, the offset module 174 outputs the updated offset and/or the updated coordinates of the camera of the MR device.

At block 214, with the updated offset value to know placement of the positioning device relative to the MR viewpoint, the correction module 176 adjusts the placement of georeferenced/geospatial virtual objects in MR relative to the MR viewpoint. Using the offsets, the correction module 176 determines the relative position of the camera of the MR device relative to the positioning device. The correction module 176 can determine a corrected position of the camera of the MR device using the offset, the viewing direction of the MR device, and the absolute position of the positioning device. From the corrected position, the MR viewpoint (i.e., the camera pose in the virtual space) can be determined relative to other virtual geospatial objects. The correction module 176 can instruct the MR device how to render the virtual geospatial objects on the MR display to render them positionally accurately (position, orientation, and scale) in relation to the physical world.

In some cases, if a substantial horizontal offset between the visualization viewpoint and the positioning device exists, the positioning module 170 can track direction of movement. The tracking is performed by calculating a movement angle between the direction of the movement and the virtual viewpoint direction, and incorporating such movement into the offset determination described herein.

The system 150 can repeat blocks 206 to 214 either periodically (e.g., 40 times per second), when input is received via the user interface 156, or at any other suitable time when the updated offset is to be determined.

Figure 14:
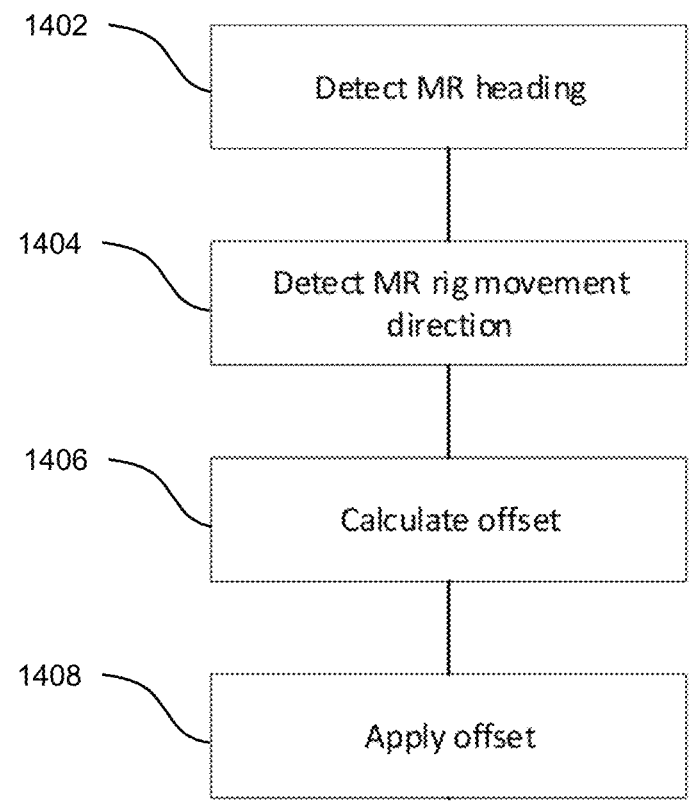
FIG. 14 is a flowchart showing an example of applying movement compensation to detect position of a visualization viewpoint relative to a positioning device.

FIG. 14 is a flowchart showing an example of applying movement compensation to detect position of the visualization viewpoint relative to the positioning device. FIG. 9 illustrates an example of such movement compensation.

At 1402, the positioning module 170 detects the vector representing the heading or orientation of the visualization viewpoint by, for example, determining an array of geographic coordinate points based on their time stamp, and then determining a trend line that forms the orientation vector. The heading is represented by vectors V12, V22 and V32 in the example of FIG. 9.

At 1404, the positioning module 170 determines the direction of movement. The direction can be determined using any suitable approach; for example, compass and GNSS/MR path convergence. The direction of movement is represented by vectors V11, V21 and V31 in the example of FIG. 9.

At 1406, the offset module 174 determines an offset by determining an angle between the heading of the visualization viewpoint and the direction of movement. The determined angle is represented as the angle between V11 and V12, V21 and V22, and V31 and V32 in the example of FIG. 9. The angle is determined by any suitable approach, such as, using trigonometric equations (e.g., calculating sides of the right triangles). The offset module 174 uses the determined angle to update x and y offsets between the visualization viewpoint and the positioning device.

At block 1408, using the determined offsets, the correction module 176 adjusts the placement of georeferenced virtual objects in MR relative to the MR viewpoint.

While the mediated reality device 192 can include a camera to capture a physical scene and a screen to display a mixture of physical and virtual objects, it is contemplated that any apparatus for blending virtual and real objects can be used; for example, a holographic system that displays holographic augmentation or projects holograms.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-executable method for determining a mediated reality positioning offset for a virtual viewpoint to display virtual geospatial objects, the method comprising:
    determining or receiving positioning parameters associated with a neutral position of a positioning device;
    subsequent to determining or receiving the positioning parameters associated with the neutral position, receiving positioning data representing a subsequent physical position of the positioning device;
    determining updated positioning parameters associated with the subsequent physical position of the positioning device;
    determining an offset comprising determining a geometric difference between the positioning parameters associated with a neutral position and the updated positioning parameters associated with the subsequent physical position; and
    outputting the offset.

2. The method of claim 1, wherein the positioning parameters comprise roll, pitch, and yaw.

3. The method of claim 1, further comprising adjusting placement of the virtual geospatial objects using the outputted offset.

4. The method of claim 3, wherein adjusting the placement of the virtual geospatial objects comprises:
determining an absolute position of the subsequent physical position using the outputted offset and a viewing direction of a physical viewpoint;
using the absolute position of the subsequent physical position, determining an updated position of the virtual viewpoint; and
instructing rendering of the virtual geospatial objects using the updated position of the virtual viewpoint.

5. The method of claim 1, further comprising tracking direction of movement of the subsequent physical position to incorporate into the offset.

6. The method of claim 5, wherein tracking the direction of movement to incorporate into the offset comprises:
detecting a vector representing an orientation of the virtual viewpoint;
determining a direction of movement between the neutral position and the subsequent physical position; and
determining an offset representing the direction of movement to incorporate into the offset by determining an angle between the vector of the orientation of the virtual viewpoint and the direction of movement.

7. A system for determining a mediated reality positioning offset for a virtual viewpoint to display virtual geospatial objects on a mediated reality device, the system in communication with a positioning device, the system comprising one or more processors in communication with a data storage to execute:
a positioning module to receive positioning parameters associated with a neutral position from the positioning device, to receive positioning data representing a subsequent physical position from the positioning device subsequent to receiving the positioning parameters associated with the neutral position, and to determine updated positioning parameters associated with the subsequent physical position;
an offset module to determine an offset by determining a geometric difference between the positioning parameters associated with a neutral position and the updated positioning parameters associated with the subsequent physical position, and output the offset.

8. The system of claim 7, wherein the positioning parameters comprise roll, pitch, and yaw.

9. The system of claim 7, wherein the positioning parameters are received from an inertial measurement unit.

10. The system of claim 7, further comprising a correction module to adjust placement of the virtual geospatial objects for the mediated reality device using the outputted offset.

11. The system of claim 10, wherein adjusting the placement of the virtual geospatial objects comprises:
determining an absolute position of the subsequent physical position using the outputted offset and a viewing direction of a physical viewpoint;
using the absolute position of the subsequent physical position, determining an updated position of the virtual viewpoint; and
instructing rendering of the virtual geospatial objects using the updated position of the virtual viewpoint.

12. The system of claim 7, wherein the positioning module further tracks direction of movement of the subsequent physical position to incorporate into the outputted offset by the offset module.

13. The system of claim 12, wherein tracking the direction of movement to incorporate into the outputted offset comprises:
detecting, by the positioning module, a vector representing an orientation of the physical viewpoint;
determining, by the positioning module, a direction of movement between the neutral position and the subsequent physical position; and
determining, by the offset module, an offset representing the direction of movement to incorporate into the outputted offset by determining an angle between the vector of the orientation of the virtual viewpoint and the direction of movement.

14. The system of claim 7, wherein the positioning device comprises a global navigation satellite system (GNSS) receiver or real-time kinematic positioning (RTK) receiver, or a combination of both.

15. The system of claim 7, wherein the positioning device comprises a total station receiver.

16. The system of claim 7, wherein an antenna of the positioning device is physically separate in space from the physical viewpoint of the mediated reality device.

17. The system of claim 16, wherein the positioning device comprises an antenna mounted on the end of an elongated object.

18. The system of claim 17, wherein receiving positioning parameters associated with the neutral position comprises retrieving the positioning parameters associated with the neutral position stored in the data storage or retrieving an indication for a user that the positioning device is in a neutral position.

19. The system of claim 17, wherein receiving positioning parameters associated with the neutral position comprises receiving an initial offset.

20. The system of claim 17, wherein the subsequent physical position comprises a tilt of the antenna relative to the base of the elongated object.

* * * * *